(12) United States Patent
Shahid

(10) Patent No.: US 6,568,074 B1
(45) Date of Patent: May 27, 2003

(54) METHOD FOR MAKING PLANAR OPTICAL FIBER CIRCUITS

(75) Inventor: Muhammed A. Shahid, Snellville, GA (US)

(73) Assignee: Fitel USA Corp.

( * ) Notice: Subject to any disclaimer, the term of this patent is extended or adjusted under 35 U.S.C. 154(b) by 167 days.

(21) Appl. No.: 09/663,239

(22) Filed: Sep. 15, 2000

(51) Int. Cl.[7] .............................. H01K 3/10; H05K 3/00; H05K 3/02; G02B 6/36
(52) U.S. Cl. .............................. 29/850; 29/845; 29/846; 385/76
(58) Field of Search .................. 29/745, 850, 846, 29/701, 741, 760, 799; 385/76, 14, 49, 51, 52, 89, 90

(56) References Cited

U.S. PATENT DOCUMENTS

| | | | | |
|---|---|---|---|---|
| 3,859,707 A | * | 1/1975 | Ragard et al. .............. | 29/566.3 |
| 4,080,730 A | * | 3/1978 | Woodman, Jr. .............. | 29/701 |
| 5,259,051 A | * | 11/1993 | Burack et al. .............. | 156/158 |
| 5,630,566 A | * | 5/1997 | Case ........................ | 248/122.1 |
| 5,710,850 A | * | 1/1998 | Watanabe et al. ............. | 385/51 |
| 5,963,697 A | * | 10/1999 | Kosugi ........................ | 385/88 |
| 2002/0022427 A1 | * | 2/2002 | Curro et al. ................ | 442/373 |

OTHER PUBLICATIONS

U.S. patent application, Ser. No.: 09/430,397, "Fan–Out Circuit Apparatus & Method for Manufacturing" by Shahid, filed on Oct. 29, 1999.

U.S. patent application, Ser. No.: 09/343,967, "Optical Harness and Cross–Connect Method" by Shahid, filed on June 30, 1999.

U.S. patent application, Ser. No.: 09/234,024, "Apparatus and Method for Manufacturing a Multifiber Interconnection Circuit" by Shahid, filed on Jan. 19, 1999.

Shahid, M.A. and Holland, W.R., "Flexible Optical Backplane Interconnections," Proceedings of MPPOI, 1996, pp. 178–185.

* cited by examiner

Primary Examiner—Carl J. Arbes
Assistant Examiner—Thiem D Phan
(74) Attorney, Agent, or Firm—Thomas, Kayden, Horstemeyer & Risley, LLP

(57) ABSTRACT

An apparatus for making optical fiber circuits including a mechanism that supplies optical fibers, a rotary support for supporting an adhesive-coated substrate in such a way that the substrate is in contact with the optical fiber, and a linear tracking arm that is equipped with a fiber routing and fixing head that routes and fixes the fibers into a shape on the substrate. Further included is a method for making optical fiber circuits including the steps of mounting a substrate on a rotary support and layering at least one layer of optical fibers from an optical fiber supply mechanism on the substrate in a shape such as a spiral by using the rotary range of motion of the substrate support and a linear range of motion of a tracking arm.

16 Claims, 2 Drawing Sheets

METHOD FOR MAKING PLANAR OPTICAL FIBER CIRCUITS

TECHNICAL FIELD

The present invention is generally related to optical fiber circuits and, more particularly, is related to an apparatus and method for making optical fiber circuits.

BACKGROUND OF THE INVENTION

Advances in light wave technology have made optical fibers a very popular medium for large bandwidth communication applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, backplanes, distribution cabinets, etc., is becoming ever increasingly important. In order to fulfill expectations across the industry, opto-electronic modules and optic fiber devices need to continue to be made miniaturized or compact, thereby taking full advantage of the maturity of micro- and opto-electronic technologies for generating, transporting, managing and delivering broadband services to ever increasing bandwidth demands of end users at increasingly lower costs. Thus, the industry has placed an emphasis on optical components such as connectors and circuits, both simple and complex, that are of a specific size or geometry. However, miniaturizing and compacting is tempered by the requirements of transmission efficiency and organization of components, sub-systems and systems.

With the miniaturization of optical modules and optical fiber devices, the management of optical fiber congestion has become an issue at optical interfaces and connection distribution points. One solution is the use of multi-fiber ribbon in which a plurality of optical fibers are organized and contained side by side in a plastic ribbon.

However, in addition to straight connections, in some applications it is desirable to re-route the optical fibers in a multi-fiber ribbon and reconfigure the optical fibers in a new multi-fiber ribbon combination. Multifiber interconnection circuits are widely known and used in the field of optical fibers. A commonly known flexible optical fiber interconnection circuit includes a configuration of optical fibers sandwiched between a pair of flexible plastic sheets, such as Kapton, or a printed circuit board (PCB). Typically, at opposing edges of the pair of sheets are the circuit's connection points for input and output. Generally, these circuits are connected at one end to another device for input, such as a laser array or another connector. The optical interconnection circuit reorganizes the light signals in a predetermined manner as it transports them across to the opposing end, typically connected to another connector or light transferring device. The input fibers and the output fibers can be either fusion spliced or mechanically spliced to the devices between which the interconnection circuit is to communicate. These interconnection circuits can take the shape of either a cross-connection circuit or a fan-out circuit.

In a typical cross-connection circuit, several separate groups of fibers are provided with input signals. Internal to the circuit, the groups of fibers can be separated and arranged to form new groupings, consisting of fibers from different input groups, to form output groups. This arrangement results in a reconfiguration of the fibers and, therefore, a reconfiguration of the light signal that was received by the interconnection circuit. The input groups can be made with ribbonized fibers or individual fibers. Where ribbonized fibers are used to provide the input for the cross-connection circuit, the fibers are separated within the structure of the circuit, reconfigured, and re-ribbonized into output groups. When individual fibers are used in the input groups, the individual fibers are separated from their input groups within the structure of the circuit and arranged to form new groups of fibers for output. These output groups can be ribbonized using ribbon connectors or another method of bonding fibers together at the output groups.

In a simple fan-out interconnection circuit, one group of fibers provides an input signal into the circuit, generally, as received from another device. The fibers are arranged in the circuit such as to separate the group, therefore separating the signal and providing multiple outputs. Similar to the cross-connection circuit, the fan-out circuit can be made using ribbonized fibers or individual fibers for the input.

In some applications it is desirable to manage a specified length of an optical fiber. Further, it is preferable to configure the fiber length so that it can be fitted in a low profile element such as a printed circuit card, or a module that can be used in a rack or shelf configuration of a communication system. It may also be desirable to control functional properties such as optical length of the fiber. This may require that the fiber length be arranged in a configuration that can be set on a temperature-controlled element, such as a hot or cold plate for which the temperature is set, controlled and maintained by a feedback mechanism.

Traditionally, such optical interconnection circuits have been manufactured by dedicated machinery or by hand. Production by dedicated machinery requires high initial investment costs and use of a machine that is either computerized or pneumatically controlled, with x-, y-, and z-, and possibly θ-, stages. These machines are large in size, bulky and expensive. Further, hand production is difficult to duplicate in high volume. Both production processes of hand or machines previously used are costly and require the use of highly skilled labor.

There continues to be strong market forces driving the development of fiber optic connection systems that take up less space and relieve congestion, while at the same time demanding that the increasing interconnection density and other unique requirements of the optical elements and modules be satisfied. Further, such optical elements or modules of an optical system should be capable of being manufactured and assembled easily and inexpensively.

Thus, a heretofore unaddressed need exists in the industry to address the aforementioned deficiencies and inadequacies.

SUMMARY OF THE INVENTION

The present invention provides an apparatus and method for making optical fiber circuits. Briefly described, the apparatus includes a mechanism that supplies or feeds an optical fiber, a rotary support for supporting an adhesive-coated substrate in such a way that the substrate is in contact with the optical fiber, and a linear tracking arm that routes the optical fiber in the shape of a planar spool on to the adhesive coated substrate. Further, the linear tracking arm may include a screw-thread mechanism to advance the position of the arm in either direction, and/or a fiber-pressing head attached to the arm that contacts the fiber, and fixes it while routing it on the adhesive-coated substrate.

The present invention can also be viewed as providing a method for making optical fiber circuits. In this regard, the method can be broadly summarized by the following steps: providing an optical fiber supply or feed mechanism, an adhesive coated substrate, a rotary support for the substrate, and a linear tracking arm having a fiber-routing head; mounting the substrate on the rotary support; and routing at least one layer of preferred length of the optical fiber drawn from the optical fiber supply mechanism and fixed into the tacky adhesive on the substrate in a desired shape such as a spiral, by using the rotary range of motion of the substrate support and the linear range of motion of the tracking arm to form a circuit. After completing the fiber routing, the fiber is severed, so that the routed fiber of the fiber circuit has a start-end and a finish-end. Further, the method may include the steps of removing the fiber circuit and substrate from the rotary support and linear tracking arm, and then applying a protective layer or coating to the substrate and the circuit. Additionally, the method may include the step of attaching the optical fiber spool to a temperature-controlled device so that its functional characteristics can be maintained by controlling the ambient temperature of the circuit.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
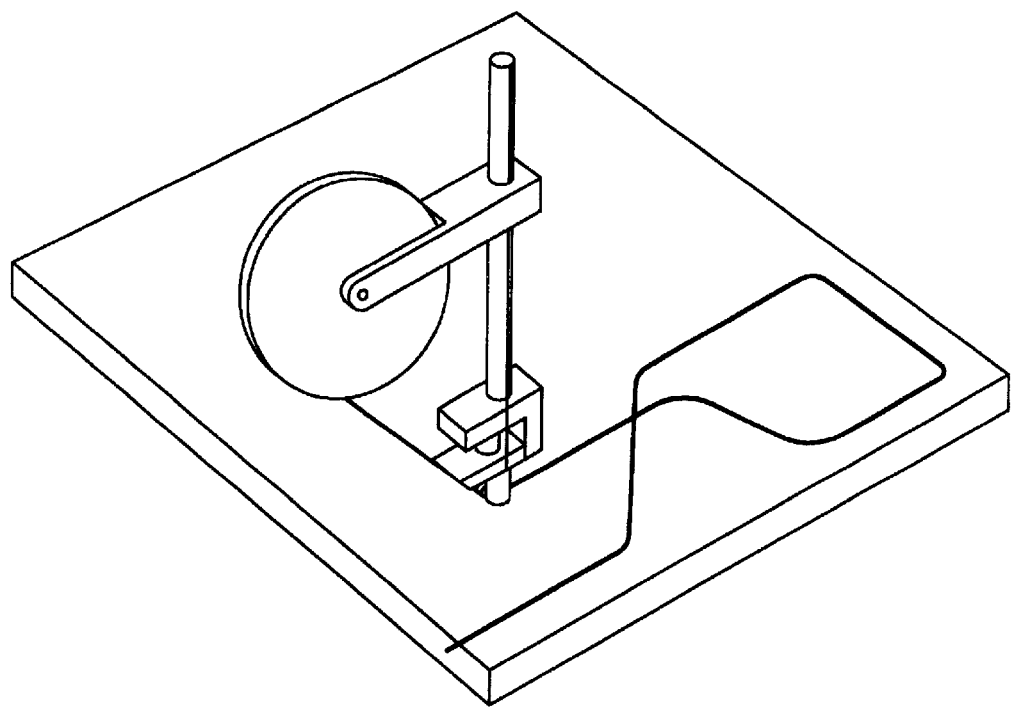
FIG. 1 is a top view of a conventional fiber routing apparatus used to make optical fiber circuits.

While the invention is susceptible to various modifications and alternative forms, a preferred embodiment thereof is shown by way of example in the drawing and will herein be described in detail. It should be understood, however, that there is no intent to limit the invention to the particular form disclosed, but on the contrary, the invention is to cover all modification, equivalents, and alternatives falling within the spirit and scope of the invention as defined by the claims.

FIG. 1 illustrates a conventional method of producing optical fiber circuit. This uses a precision four-axis machine that requires a highly skilled operator and is costly. For example, see U.S. Pat. No. 5,259,051 which discloses an apparatus for routing optical fiber that comprises an elongated manipulator having a vertical axis which can be controlled to move in an X-Y plane and in the θ direction around its vertical axis.

Figure 2:
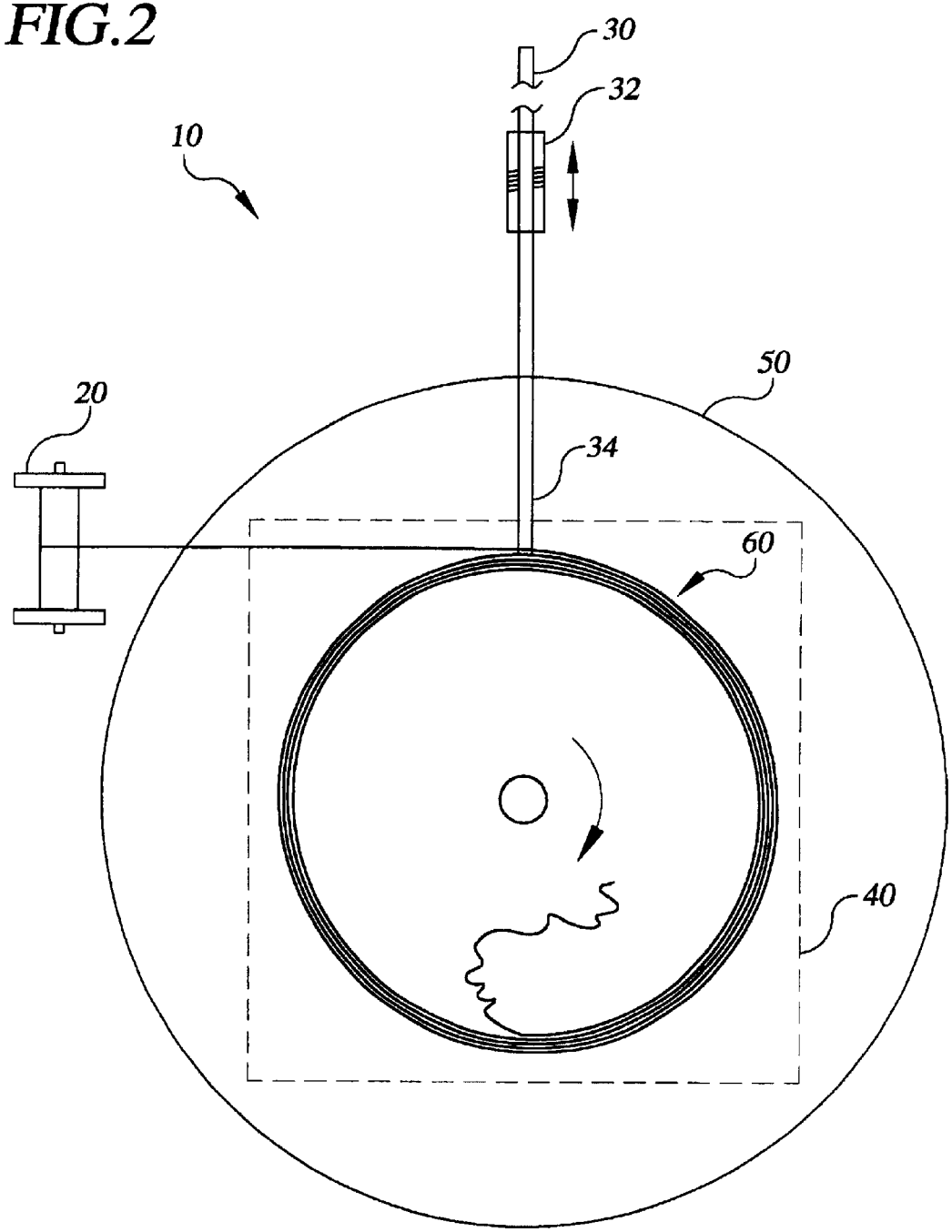
FIG. 2 is a top view of the apparatus used to make optical fiber circuits.

FIG. 2 illustrates a preferred embodiment for an apparatus 10 for assembling an optical fiber circuit where the apparatus includes at least one optical fiber supply or feed mechanism 20, a linear tracking arm 30, an adhesive-coated substrate 40 and a rotary stage or support 50 for the substrate 40. Further, the linear tracking arm 30 may have a screw thread mechanism 32 which may advance the tracking arm 30 in either direction. The advancement of the tracking arm 30 controls the "pitch", or the fiber-to-fiber spacing of the fiber as it is routed and attached onto the substrate 40. The linear tracking arm 30 may further have a fiber-pressing/routing head 34, attached to the screw thread mechanism portion 32, that guides the fiber and bonds the fiber as it is routed onto the adhesive-coated substrate 40 to produce an optical fiber circuit 60 of a desired shape. For example, when the rotary motion of the substrate support 50 is coupled with the linear motion of the routing head 34 via the linear tracking arm 30, the resulting optical fiber circuit will take a planar spiral shape. Such a fiber circuit can be defined as a planar fiber spool. After routing the desired length of the fiber, the fiber is severed from the fiber supply/feed mechanism 20.

In another embodiment, the apparatus for making the fiber-routed circuit may include a protective layer or coating on the planar fiber spool. The protective layer could be another sheet of plastic material such as Kapton™ or polyurethane. Alternatively a silicone-based coating with suitable additives can be applied to protect the optical fiber circuit.

The optical fiber supplied from the mechanism 20 may be made of either glass or plastic. The glass fibers may be single mode, multi mode, polarization-maintaining, erbium-doped, or any other specialty fiber. The coating on the fiber may be either the standard acrylate coating or thin polyimide coating, or any other specialty coating.

In a preferred embodiment of the fiber-routed circuits, the adhesive that coats the substrate 40 is silicone- or acrylic-based. This adhesive may have been previously applied to the substrate. Alternatively, the adhesive may be applied locally immediately before routing and fixing the fiber in it. In yet another embodiment, adhesive may be applied to the fiber immediately before fixing it on to the substrate. Both alternatives may require an adhesive applicator (not shown in FIG. 2). The substrate 40 may be either of rigid or flexible material. In a preferred embodiment a rigid substrate is made from FR-4 printed circuit board (PCB) material. If the substrate is flexible, a preferred sheet of material such as Kapton™ is used.

This invention also encompasses the method of making optical fiber circuits, including the following steps: an optical fiber supply or feed mechanism 32, an adhesive-coated fiber-routing substrate 40, a rotary support 50 for the substrate 40, and a linear tracking arm 30 fitted, for example, with a fiber-routing head 34 are provided. Then, the substrate 40 is mounted on the rotary support 50, followed by routing and fixing at least one layer of optical fiber from the optical fiber supply mechanism 32 on the substrate 40, in a shape such as spiral shape, by using the rotary motion of the substrate support 50 and a linear motion of the tracking arm 30. At the end of the fiber routing operation, the fiber is severed from the fiber supply/feed mechanism 32. Another embodiment of the invention may include the steps of removing the substrate 40 and spooled fiber circuit 60 from the rotary support 50, applying a protective coating to the substrate 40 and the fiber circuit 60, and attaching the optical fiber spool to a temperature-control device so as to control ambient temperature. Controlling ambient temperature is one convenient way of controlling some functional parameters of optical components, optical circuits and devices. For example, in an optical amplifier module energy is taken from a "pump light" and converted into a "signal light". The spools produced by the present invention offer a convenient package of precisely controlling and maintaining optical length of an optical fiber circuit 60. The planar spools are also useful in optical delay lines, where time delays can be created by managing the length of the optical fiber. By using the spools produced by the present invention, these time delays can be more accurately controlled. Further, the planar spools produced by the present invention are also useful in fiber optic filters, where the fibers are specially treated for a specific length of the optical fiber.

The present invention is designed to replace the bulky and expensive equipment previously known in the art with a device and method that is inexpensive to build and simple to use. Only three elements, the mechanism 32 that supplies and feeds the optical fibers, a turntable-like rotary support 50, and a linear tracking arm 30, all easily assembled, may be used to form the planar spooled fiber-routed circuits 60 on suitably fabricated substrates.

The substrate 40 with the adhesive coated on its top surface may be temporarily attached, for example, by vacuum or light adhesive, to the rotary support 50 of the turntable. As noted above, upon formation of the planar optical fiber-routed circuit 60, the fiber circuit 60 and substrate 40 may be removed from the rotary support 50. The fiber circuit 60 and substrate 40 may then be coated or protected with another layer of the substrate 40 material. Alternatively, in another embodiment of the invention, a multi-layer fiber spool can be produced by the lateral translation of the fiber-mounting head 34. In this embodiment, after completing the first layer as described above, and before cutting the fiber, another sheet of the substrate 40 is placed on the already-routed spooled circuit. This substrate 40 has tacky adhesive coated on both of its surfaces. Additionally, it has a slit or cut from one edge to its mid-point. The uncut fiber is slipped through the cut, and the double-sided sheet of substrate 40 is positioned in place on top of the previously routed circuit. The routing is continued on the top side of this second substrate 40 so that the linear motion of the tracking element 30 is reversed in relation to the portion of the circuit 60 that was routed before. After completing the circuit length at this second layer, the fiber is severed from the supply mechanism 20.

Alternately, if more layers are to be added, then the above process of adding layer of substrate sheet 40 coated on both of its sides, followed by continued fiber routing, is continued until the desired number of layers is completely fiber-routed. After severing the fiber from the supply/feed mechanism 20, a protective layer of material may be applied to the top-most fiber-routed circuit.

Upon formation of the spools, the linear arm 30 may have two sections, the screw-thread mechanism 32 to advance position of the arm in either direction, and a fiber-pressing head 34 which is attached to the screw-thread mechanism portion of the arm. The "pitch" of the screw may be adjusted so that it synchronizes with the rotation of the table in order to optionally layer the fibers in a spiral form, cheek-to-cheek.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Having thus described the invention, at least the following is claimed:

1. A method of making optical fiber circuits comprising the steps of:

providing
      an optical fiber supply mechanism,
      an adhesive-coated substrate,
      a rotary support for the substrate, and
   a linear tracking arm that is equipped with a fiber routing and fixing head, wherein the linear tracking arm is located above the substrate and extends thereacross from the outer perimeter toward the center thereof, completely detached from the optical fiber supply mechanism;
   mounting the substrate on the rotary support; and
   forming at least one layer of optical fiber from the optical fiber supply mechanism on the substrate in a shape by using the rotary range of motion of the substrate support and the linear range of motion of the tracking arm; and
   severing the fiber from the fiber supply mechanism.

2. The method of claim 1, further comprising the step of:
   applying a protective coating to the substrate and the circuit.

3. The method of claim 2, wherein the step of providing the protective coating further comprises the step of providing Kapton™.

4. The method of claim 2, wherein the step of providing the protective coating further comprises the step of providing a silcone-based substance.

5. The method of claim 1, further comprising the step of:
   removing the fiber circuit and substrate from the rotary support.

6. The method of claim 1, further comprising the step of:
   attaching the substrate of the optical fiber circuit to a temperature-controlled device.

7. The method of claim 1, wherein the step of providing optical fibers supplied from the mechanism further comprises providing plastic optical fibers.

8. The method of claim 1, wherein the step of providing optical fiber further comprises providing glass optical fibers.

9. The method of claim 8, wherein the step of providing glass fibers further comprises selecting glass optical fibers that are selected from the group consisting of: single mode, multimode, polarization-maintaining and erbium-doped.

10. The method of claim 1, wherein the step of providing an adhesive-coated substrate further comprises providing an adhesive that comprises silicone.

11. The method of claim 1, wherein the step of providing an adhesive-coated substrate further comprises providing an acrylic-based adhesive.

12. The method of claim 1, wherein the step of providing the substrate further comprises the step of providing a rigid substrate.

13. The method of claim 12, wherein the step of providing the rigid substrate further comprises the step of providing a FR-4 printed circuit board material.

14. The method of claim 1, wherein the step of providing the substrate further comprises the step of providing a flexible substrate.

15. The method of claim 14, wherein the step of providing the flexible substrate further comprises providing Kapton™.

16. The method of claim 1, wherein the step of providing the linear tracking arm further comprises the step of providing:
   a screw-thread mechanism to advance the position of the arm in either direction; and
   a fiber-pressing head attached to the arm that contacts the fiber, routing it on the substrate substantially as a planar spool.

* * * * *